US011056820B2

(12) United States Patent
Li

(10) Patent No.: US 11,056,820 B2
(45) Date of Patent: Jul. 6, 2021

(54) SC COMBINED TAIL SLEEVE WITH CHANGEABLE POLARITY

(71) Applicant: HUIZHOU FIBERCAN INDUSTRIAL CO., LTD., Huizhou (CN)

(72) Inventor: Yaole Li, Huizhou (CN)

(73) Assignee: HUIZHOU FIBERCAN INDUSTRIAL CO., LTD., Huizhou (CN)

( * ) Notice: Subject to any disclaimer, the term of this patent is extended or adjusted under 35 U.S.C. 154(b) by 0 days.

(21) Appl. No.: 16/788,259

(22) Filed: Feb. 11, 2020

(65) Prior Publication Data

US 2021/0159630 A1    May 27, 2021

(30) Foreign Application Priority Data

Nov. 27, 2019  (CN) .......................... 201922083928.1

(51) Int. Cl.
    H01R 13/506    (2006.01)
(52) U.S. Cl.
    CPC .................................. H01R 13/506 (2013.01)
(58) Field of Classification Search
    CPC ............................ H01R 13/506; H01R 13/562; H01R 13/6335; G02B 6/387; G02B 6/3893; G02B 6/3825; G02B 6/3897
    See application file for complete search history.

(56) References Cited

U.S. PATENT DOCUMENTS

| 5,166,995 A * | 11/1992 | Briggs ................. G02B 6/3807 385/58 |
| 9,678,283 B1 * | 6/2017 | Chang .................. G02B 6/3879 |
| 9,684,130 B2 * | 6/2017 | Veatch ................. G02B 6/3831 |
| 10,042,129 B2 * | 8/2018 | Taira ..................... G02B 6/3825 |
| 10,539,758 B2 * | 1/2020 | Butler .................. G02B 6/3887 |
| 10,620,384 B2 * | 4/2020 | Iizumi .................. G02B 6/3831 |
| 10,768,381 B2 * | 9/2020 | Li ......................... G02B 6/3879 |
| 2010/0220961 A1 * | 9/2010 | de Jong ............... G02B 6/3879 385/77 |
| 2017/0363818 A1 * | 12/2017 | Suzic ................... G02B 6/3895 |
| 2018/0341069 A1 * | 11/2018 | Takano ................ G02B 6/3878 |

* cited by examiner

Primary Examiner — Oscar C Jimenez
(74) Attorney, Agent, or Firm — Michael Porco

(57) ABSTRACT

The present utility model discloses an SC combined tail sleeve with changeable polarity, which includes an SC body composed of an SC plug and a claw fixing bracket, the SC plug and the claw fixing bracket are both snapped in a combined base, the rear snapping box and the front snapping box respectively fix the SC plug and the claw fixing bracket to ensure the reliability and various performances of the SC body in signal connection. The SC plug and the claw fixing bracket are both snapped in the combined base, when it is necessary to withdraw from a mating state, holding the combined base can simultaneously drive the SC plug and the claw fixing bracket to retreat at the same time, so as to achieve the purpose of withdrawing from the mating state, thus its operation is simple and convenient, and the rear snapping box and the front snapping box of the present utility model can be detached flexibly, and a polarity swapping of the two SC bodies can be easily realized.

7 Claims, 3 Drawing Sheets

SC COMBINED TAIL SLEEVE WITH CHANGEABLE POLARITY

RELATED APPLICATIONS

This patent application claims the benefit of priority to Chinese Patent Application No. 201922083928.1, filed Nov. 27, 2019. The entire content of the foregoing application is incorporated herein by reference, including all text and drawings.

TECHNICAL FIELD

The present utility model relates to an SC combined tail sleeve with changeable polarity.

BACKGROUND

An optical fiber connector is a device for detachable (movable) connection between the optical fibers, the optical fiber connector affects the reliability and various performances of the optical transmission system.

For an SC (Standard Connector) type optical fiber connector, the claw fixing bracket thereof is rectangular, when the SC plug is connected with the SC adapter, the claw fixing bracket is snapped in a groove of the SC adapter, thereby realizing the reliable inserting connection of the SC plug and the SC adapter, when withdrawing from the mating, you need to pull the claw fixing brackets out of the groove when pulling out the SC plug. In the existing SC duplex connector, it is inconvenient to interchange the polarities when the polarities of the two connectors needs to be changed, and since only the SC plug is fixed, the combined base can only drive the SC plug, and the claw fixing bracket is still buckled in the groove, without using fingers to push the claw fixing bracket out of the groove, withdraw from the mating state may not be realized.

SUMMARY

In order to overcome the deficiencies of the prior art, the present utility model provides an SC combined tail sleeve with changeable polarity.

The technical solution adopted by the present utility model to solve its technical problems is: an SC combined tail sleeve with changeable polarity, including an SC body composed of an SC plug and a claw fixing bracket, the SC plug and the claw fixing bracket are both snapped in a combined base.

Preferably, the combined base comprises a rear snapping box for receiving the SC plug through snap-fit, a front snapping box for receiving the claw fixing bracket through snap-fit, the rear snapping box is fixedly connected to the front snapping box.

Preferably, the rear snapping box is provided with a first mounting groove for snap-fitting the SC plug, and the rear snapping box is provided with a rear snapping upper cover and a rear snapping lower cover, the rear snapping upper cover and the rear snapping lower cover are snap-connected, the rear snapping upper cover is provided with a first groove, the rear snapping lower cover is provided with a second groove, the first groove and the second groove form a first mounting groove, a middle portion of the SC plug is cylindrical and is located in the first mounting groove.

Preferably, a first buckle is provided in the rear snapping lower cover, the rear snapping upper cover is provided with a first buckle opening corresponding to the first buckle.

Preferably, the SC plug is provided with a boss having a keyway shape at a tail thereof, and the rear snapping box is provided with a limiting slot for limiting the boss.

Preferably, the front snapping box is provided with a second mounting groove for snap-fitting the claw fixing bracket, and the front snapping box is provided with a front snapping upper cover and a front snapping lower cover, the front snapping upper cover and the front snapping lower cover are snap-connected, and the front snapping upper cover is provided with a third groove, the front snapping lower cover is provided with a fourth groove, the third groove and the fourth groove form a second mounting groove.

Preferably, outer sides of the front snapping upper cover and the front snapping lower cover are both provided with anti-slip patterns.

Preferably, the front snapping upper cover is provided with a second buckle, and the front snapping lower cover is provided with a second buckle opening corresponding to the second buckle.

Preferably, the second buckle opening is disposed between adjacent second mounting grooves.

Preferably, there are two SC bodies.

An SC combined tail sleeve with changeable polarity is disclosed in the present utility model, the rear snapping box and the front snapping box respectively fix the SC plug and the claw fixing bracket to ensure the reliability and various performances of the SC body in signal connection. The SC plug and the claw fixing bracket are both snapped in the combined base, when it is necessary to withdraw from a mating state, holding the combined base can simultaneously drive the SC plug and the claw fixing bracket to retreat at the same time, so as to achieve the purpose of withdrawing from the mating state, thus its operation is simple and convenient, and the rear snapping box and the front snapping box of the present utility model can be detached flexibly, and a polarity swapping of the two SC bodies can be easily realized.

BRIEF DESCRIPTION OF THE DRAWINGS

The present utility model is further described with reference to the drawings and embodiments in the following.

DETAILED DESCRIPTION

Figure 1:
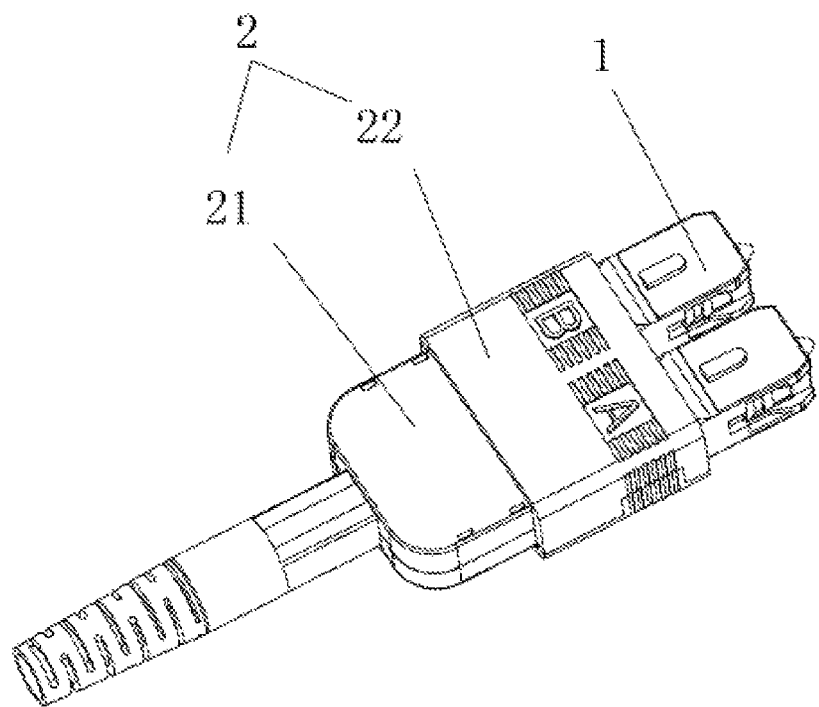
FIG. 1 is a structural schematic diagram of the present utility model.
Figure 2:
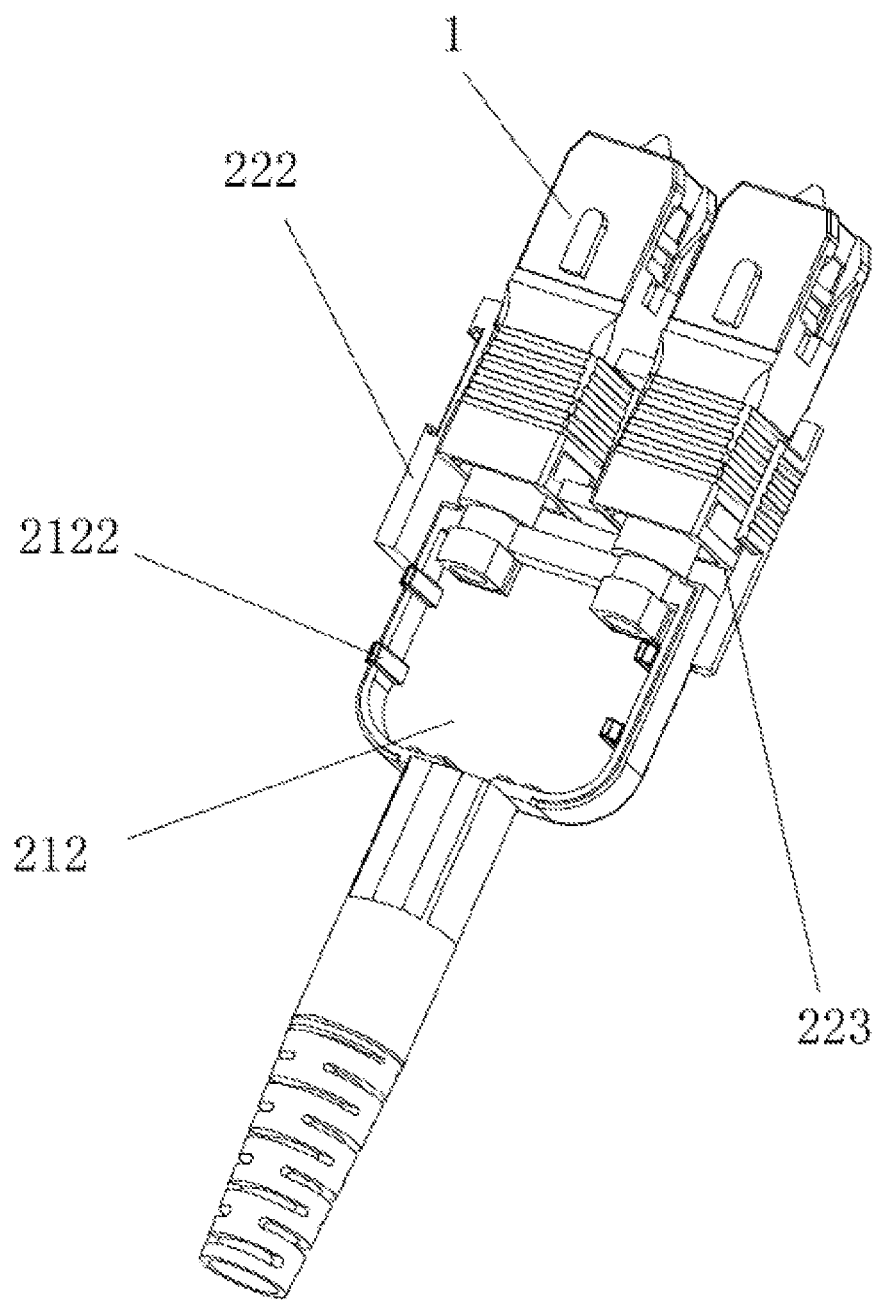
FIG. 2 is a partial structural schematic diagram of the present utility model.
Figure 3:
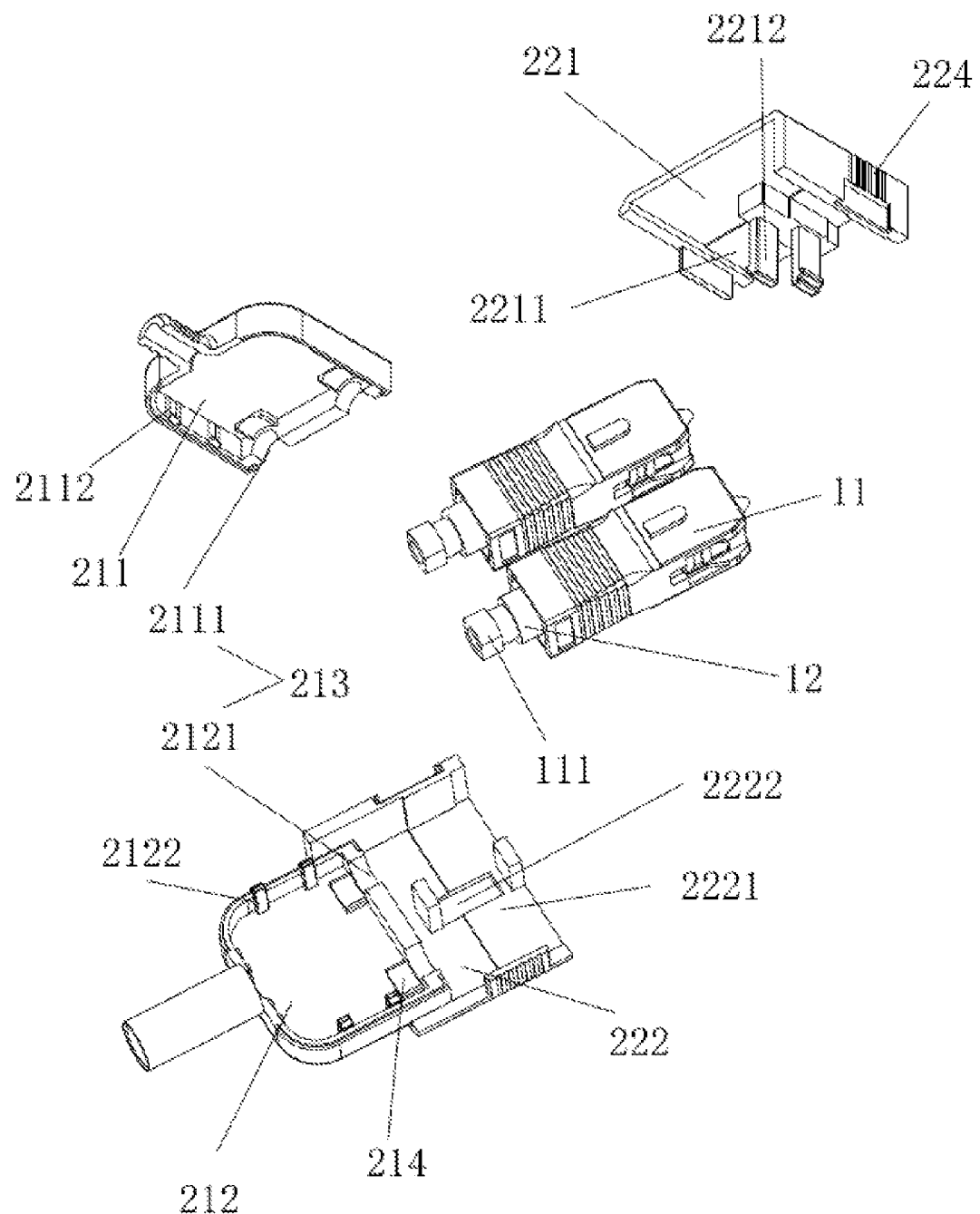
FIG. 3 is an explosion diagram of the present utility model.

Referring to FIGS. 1 to 3, the present utility model is implemented as follows: the SC combined tail sleeve with changeable polarity includes an SC body 1 composed of an SC plug 11 and a claw fixing bracket 12, wherein there are two of the SC bodies 1. The SC plug 11 and the claw fixing bracket 12 are both snapped in the combined base 2. When it is necessary to withdraw from a mating state, holding the combined base 2 can simultaneously drive the SC plug 11 and the claw fixing bracket 12 to retreat at the same time, so as to achieve the purpose of withdrawing from the mating state.

The combined base 2 includes a rear snapping box 21 for receiving the SC plug 11 through snap-fit and a front snapping box 22 for receiving the claw fixing bracket 12 through snap-fit, the front snapping box 22 holds a part of the rear snapping box 21 therein and fixes the rear snapping box 21.

The SC plug 11 is provided with a boss 111 having a keyway shape at the tail, a limiting slot 214 is arranged in the rear snapping box 21 for limiting the boss 111.

The rear snapping box 21 is provided with a first mounting groove 213 for snap-fitting the SC plug 11. The rear snapping box 21 is provided with a rear snapping upper cover 211, a rear snapping lower cover 212, the rear snapping upper cover 211 and the rear snapping lower cover 212 are snap-connected, the rear snapping upper cover 211 is provided with a first groove 2111, the rear snapping lower cover 212 is provided with a second groove 2121, the first groove 2111 and the second groove 2121 form the first mounting groove 213. A middle portion of the SC plug 11 is cylindrical and is located in the first mounting groove 213.

The rear snapping lower cover 212 is provided with a first buckle 2122, and the rear snapping upper cover 211 is provided with a first buckle opening 2112 corresponding to the first buckle 2122. When assembling, the first buckle 2122 is snapped into the first buckle opening 2112, and when disassembling, the first buckle 2122 is removed from the first buckle opening 2112.

The front snapping box 22 is provided with a second mounting groove 223 for snap-fitting the claw fixing bracket 12. The front snapping box 22 is provided with a front snapping upper cover 221, a front snapping lower cover 222, and the front snapping upper cover 221 and the front snapping lower cover 222 are snap-connected, the front snapping upper cover 221 is provided with a third groove 2211, the front snapping lower cover 222 is provided with a fourth groove 2221, the third groove 2211 and the fourth The groove 2221 form the second mounting groove 223. The front snapping upper cover 221 is provided with a second buckle 2212, and the front snapping lower cover 222 is provided with a second buckle opening 2222 corresponding to the second buckle 2212. The second buckle opening 2222 is disposed between adjacent second mounting grooves 223. When assembling, the second buckle 2212 is snapped into the second buckle opening 2222, when disassembling, the second buckle 2212 is removed from the second buckle opening 2222. At the same time, the second buckle opening 2222 is disposed between the adjacent second mounting grooves 223, which is convenient for exchanging the two SC bodies 1, and is convenient for picking up the SC bodies 1.

During assembling, the rear snapping lower cover 212 is snapped in the front snapping lower cover 222, the SC plug 11 is snapped in the second groove 2121, and the claw fixing bracket 12 is snapped in the fourth groove 2221, at the same time, a middle portion of the SC plug 11 is inserted into the first mounting groove 213, and then the rear snapping upper cover 211 and the rear snapping lower cover 212 are snap-connected, and the front snapping upper cover 221 and the front snapping lower cover 222 are snap-connected, thus the assembling is completed, if the polarity need to be changed, the second buckle 2212 is removed from the second buckle opening 2222, and the front snapping upper cover 221 and the front snapping lower cover 222 is disassembled, If the polarity of one of the SC bodies 1 needs to be changed, the one of the SC bodies 1 is rotated, after the one of the SC bodies 1 is rotated 180 degrees, the polarity of the one of the SC bodies 1 is changed, at this time, if the polarity of another of the SC bodies 1 needs to be changed, the other of the SC bodies 1 is rotated, after the other of the SC bodies 1 is rotated 180 degrees, the polarity of the other of the SC bodies 1 is changed, then, the polarity can be exchanged by assembling according to the above assembling steps, which is simple and convenient.

Outer sides of the front snapping upper cover 221 and the front snapping lower cover 222 are provided with anti-slip patterns 224, which are convenient for the combined base 2 to be taken out, inserted, and pulled out.

In the present utility model, the rear snapping box 21 and the front snapping box 22 respectively fix the SC plug 11 and the claw fixing bracket 12 to ensure the reliability and various performances of the SC body 1 in signal connection. The SC plug 11 and the claw fixing bracket 12 are both snapped in the combined base 2, when it is necessary to withdraw from a mating state, holding the combined base 2 can simultaneously drive the SC plug 11 and the claw fixing bracket 12 to retreat at the same time, so as to achieve the purpose of withdrawing from the mating state, thus its operation is simple and convenient, and the rear snapping box 21 and the front snapping box 22 of the present utility model can be detached flexibly, and a polarity swapping of the two SC bodies 1 can be easily realized.

The invention claimed is:

1. An SC combined tail sleeve with changeable polarity, comprising an SC body (1) composed of an SC plug (11) and a claw fixing bracket (12), wherein the SC plug (11) and the claw fixing bracket (12) are both snapped in a combined base (2), wherein the combined base (2) comprises a rear snapping box (21) for receiving the SC plug (11) through snap-fit, a front snapping box (22) for receiving the claw fixing bracket (12) through snap-fit, the rear snapping box (21) is fixedly connected to the front snapping box (22), the rear snapping box (21) is provided with a first mounting groove (213) for snap-fitting the SC Plug (11), and the rear snapping box (21) is provided with a rear snapping upper cover (211) and a rear snapping lower cover (212), the rear snapping upper cover (211) and the rear snapping lower cover (212) are snap-connected, the rear snappinq upper cover (211) is provided with a first groove (2111), the rear snapping lower cover (212) is provided with a second groove (2121), the first groove (2111) and the second groove (2121) form the first mounting groove (213), a middle portion of the SC plug (11) is cylindrical and is located in the first mounting groove (213), and the front snapping box (22) is provided with a second mounting groove (223) for snap-fitting the claw fixing bracket (12), and the front snapping box (22) is provided with a front snapping upper cover (221) and a front snapping lower cover (222), the front snapping upper cover (221) and the front snapping lower cover (222) are snap-connected, and the front snapping upper cover (221) is provided with a third groove (2211), the front snapping lower cover (222) is provided with a fourth groove (2221), the third groove (2211) and the fourth groove (2221) form the second mounting groove (223).

2. The SC combined tail sleeve with changeable polarity according to claim 1, wherein a first buckle (2122) is provided in the rear snapping lower cover (212), the rear snapping upper cover (211) is provided with a first buckle opening (2112) corresponding to the first buckle (2122).

3. The SC combined tail sleeve with changeable polarity according to claim 1, wherein the SC plug (11) is provided with a boss (111) having a keyway shape at a tail thereof, and the rear snapping box (21) is provided with a limiting slot (214) for limiting the boss (111).

4. The SC combined tail sleeve with changeable polarity according to claim 1, wherein outer sides of the front snapping upper cover (221) and the front snapping lower cover (222) are both provided with anti-slip patterns (224).

5. The SC combined tail sleeve with changeable polarity according to claim 1, wherein the front snapping upper cover (221) is provided with a second buckle (2212), and the front snapping lower cover (222) is provided with a second buckle opening (2222) corresponding to the second buckle (2212).

6. The SC combined tail sleeve with changeable polarity according to claim 5, wherein the second buckle opening (2222) is disposed between adjacent second mounting grooves (223).

7. The SC combined tail sleeve with changeable polarity according to claim 1, wherein there are two SC bodies (1).

\* \* \* \* \*